United States Patent [19]

Chang et al.

[11] Patent Number: 5,361,383
[45] Date of Patent: Nov. 1, 1994

[54] OPTICAL FIBER HAVING INTERNAL PARTIAL MIRRORS AND INTERFEROMETER USING SAME

[75] Inventors: David B. Chang, Tustin; Victor Vali, Laguna Hills, both of Calif.

[73] Assignee: Hughes Aircraft Company, Los Angeles, Calif.

[21] Appl. No.: 783,798

[22] Filed: Nov. 30, 1991

[51] Int. Cl.$^5$ ............................. G02B 6/26; G01B 9/02
[52] U.S. Cl. .................................... 385/27; 385/39; 385/12; 385/14; 385/43; 385/48; 385/95; 385/96; 385/98; 356/345; 356/352
[58] Field of Search .................... 385/27, 28, 29, 30, 385/12, 31, 32, 39, 43, 47, 48, 95, 96, 98, 51, 14; 356/345, 352

[56] References Cited

U.S. PATENT DOCUMENTS

| | | | |
|---|---|---|---|
| 4,076,375 | 2/1978 | Muska | 385/29 X |
| 4,125,768 | 11/1978 | Jackson et al. | 385/27 X |
| 4,475,789 | 10/1984 | Kahn | 385/48 |
| 4,641,914 | 2/1987 | Sheem | 385/95 X |
| 4,804,248 | 2/1989 | Bhagavatula | 385/28 X |
| 4,848,999 | 7/1989 | Taylor | 65/4.3 |
| 4,900,114 | 2/1990 | Mortimore et al. | 385/43 X |
| 4,900,116 | 2/1990 | Mathis | 385/27 X |
| 4,923,273 | 5/1990 | Taylor | 372/6 X |
| 4,946,250 | 8/1990 | Gonthier et al. | 385/43 X |
| 4,974,931 | 12/1990 | Poole | 385/28 X |
| 4,995,697 | 2/1991 | Adamovsky | 385/12 X |
| 5,054,875 | 10/1991 | Curran | 385/27 |
| 5,062,684 | 11/1991 | Clayton et al. | 385/27 X |
| 5,073,004 | 12/1991 | Clayton et al. | 385/27 |
| 5,138,675 | 8/1992 | Schofield | 385/28 |
| 5,237,630 | 8/1993 | Hogg et al. | 385/12 |

FOREIGN PATENT DOCUMENTS

| | | | |
|---|---|---|---|
| 1284282 | 5/1991 | Canada | 385/27 X |
| 0477518 | 4/1992 | European Pat. Off. | 385/43 X |

OTHER PUBLICATIONS

Lee et al., "Fiber Optic Sensor Research..." SPIE vol. 1170, Fiber Optic Smart Structures II (1989) pp. 113–122.

Horche et al., "Spectral Behavior of a Low-Cost All-Fiber..." IEEE Photonics Tech. Lett., vol. I, No. 7, Jul. 1989 4 Pages.

*Primary Examiner*—Brian Healy
*Attorney, Agent, or Firm*—Georgann S. Grunebach; Terje Gudmestad; Wanda K. Denson-Low

[57] ABSTRACT

An optical fiber disposed to partially internally reflect optical energy passing therethrough is disclosed herein. The optical fiber 10 of the present invention includes an internal partial mirror disposed to partially transmit and to partially reflect optical energy incident thereon. The internal mirror is effectively realized at an interface I of first and second fiber segments 14 and 18. The first fiber segment 14 includes a first core region 22 which circumscribes a longitudinal axis X. The first core region 22 is of a first cross-sectional area perpendicular to the longitudinal axis X. The inventive fiber 10 further includes a second fiber segment 18 in optical communication with the first fiber segment 14. The second fiber segment 18 includes a second core region 24 which circumscribes the longitudinal axis X, wherein the second core region 24 is of a second cross-sectional area perpendicular thereto.

10 Claims, 2 Drawing Sheets

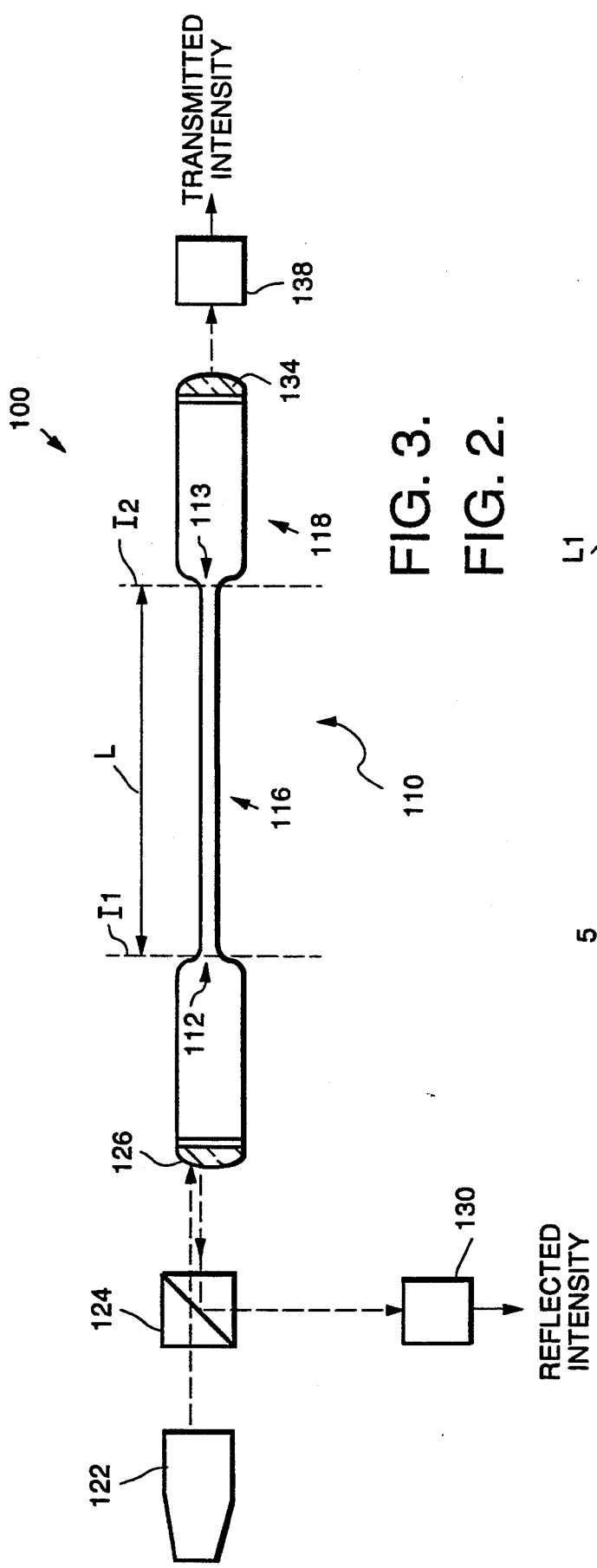
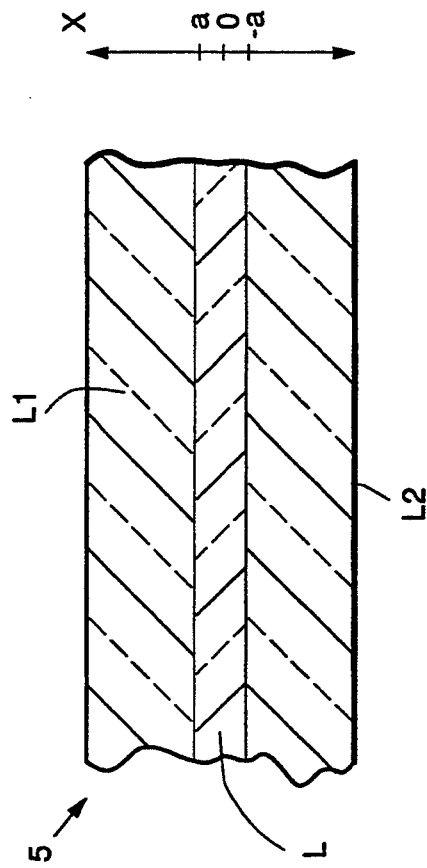
FIG. 3.
FIG. 2.

OPTICAL FIBER HAVING INTERNAL PARTIAL MIRRORS AND INTERFEROMETER USING SAME

BACKGROUND OF THE INVENTION

1. Field of the Invention

This invention relates to optical fibers. More specifically, this invention relates to optical fibers employed in fiber optic sensors and interferometers.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Considerable progress has been made recently in the development of fiber optic sensors. This is due in part to the advantages afforded by fiber optic sensors over conventional sensors. Chief among these are increased sensitivity, faster response, geometric versatility, substantial immunity to electromagnetic interference, large bandwidth for high speed information transmission, and the capability to measure a variety of physical phenomenon (i.e. temperature, pressure, strain, rotation, and acoustic and magnetic fields). In addition, the dielectric construction of fiber optic sensors allows use in high voltage, high temperature, or corrosive environments. Finally, the electronic and opto-electronic components used to monitor the optical energy propagating through the fiber may be remotely located with respect to the sensing environment.

In conventional fiber optic sensors light guided within an optical fiber is modified in reaction to various external physical, chemical or similar influences. In operation, light from a source having relatively stable optical properties is typically coupled into the fiber of the conventional sensor. The light is then directed by the fiber to a region in which a measurement is to take place. In extrinsic sensors the guided light then may exit the fiber and interact with the substance being measured (measurand) prior to being launched into the same or a different fiber. Alternatively, in intrinsic sensors the light remains within the fiber throughout the measurement region.

In extrinsic sensors reflection losses are incurred as the guided light leaves the optical fiber and enters the measurand. In particular, these reflection losses are proportional to the difference between the indices of refraction of the fiber and the measurand. At present, the minimum index of refraction (at visible wavelengths) of optical fibers is believed to be approximately 1.4. Consequently, reflection losses are generally unavoidable when extrinsic sensors are employed to analyze material having an index of refraction (n) less than 1.4. For example, in the visible region water exhibits an index of refraction of approximately 1.33.

In another type of optical fiber sensor, generally known as an evanescent field sensor, the light guided by the fiber partially couples to the measurand via an evanescent (i.e. exponentially decaying) field which surrounds the fiber. In evanescent mode sensors, a cladding sheath surrounding the optical fiber core is made sufficiently thin such that an evanescent mode is supported by the fiber. In an evanescent mode, a portion of the optical energy carried by the fiber propagates along the length of the fiber within a region of space immediately surrounding the cladding. The measurand surrounding the fiber may either absorb or change the properties of the evanescent field, thus enabling a measurement to be performed. Employment of evanescent mode over extrinsic mode fiber sensors may be preferred in applications requiring direct interaction between the light beam and the measurand since evanescent mode requires no relaunching of the beam.

A distinction may also be made between interferometric and intensity-modulated fiber optic sensors. It is generally recognized that interferometric sensors provide improved sensitivity, wider dynamic range, and better accuracy than intensity modulated sensors. In the latter, intensity fluctuations of light propagating through a fiber disposed in the measurand are directly monitored in order to generate a detection signal. The sensor is designed such that the detection signal is indicative of changes occurring in a particular physical characteristic of the measurand.

In contrast, within interferometric sensors, light traversing two or more optical paths is coherently mixed such that an interference pattern is formed. The phase difference between light from the constituent optical paths may then be discerned by analyzing the interference pattern. In this manner interferometric sensors are designed such that a change in a physical characteristic of the measurand affects the measured phase difference, thus allowing a detection signal to be synthesized in response thereto.

In the field of interferometric fiber optic sensors, those utilizing multiple-beam interferometers are typically more accurate than those employing dual-beam devices such as the Michelson interferometer. Among multiple-beam interferometers, those identified as being of the Fabry-Perot variety are widely employed. Specifically, Fabry-Perot interferometric sensors operate to yield well-defined interference patterns by combining multiple optical reflections from within a single fiber. The fiber defines a resonant cavity which is typically bounded by a pair of partially reflective mirrors external thereto. Alternatively, an air gap may be introduced between a pair of fiber segments to serve as a surrogate for a physical partially reflective mirror. However, this latter approach results in a high sensitivity to physical perturbation and limits the maximum reflectance which may be effected.

In an attempt to overcome such difficulties a technique for developing optical fiber segments having internal partially reflective structures has recently been proposed. Specifically, in "Fiber Optic Sensor Research at Texas A&M University"; by H. F. Taylor and C. E. Lee; *Proceedings of The International Society for Optical Engineering*, vol. 1170 (Fiber Optic Smart Structures and Skins II), p. 113 (1989), a technique for fabricating internal dielectric mirrors in continuous lengths of silica fiber is disclosed. The approach involves slicing a silica fiber and coating one of the exposed ends with a thin film of titanium oxide $TiO_2$. The coated end is then joined to an uncoated end of a similarly spliced fiber using an electric fusion splicer. In this manner, a continuous length of fiber which contains multiple internal mirrors of desired reflectance may be produced.

Unfortunately, fabrication of the optical fiber suggested by Taylor will generally need to occur within a relatively particle-free environment in order to prevent contamination of the exposed internal fiber surfaces. Moreover, the construction process is further complicated by the requirement that the component fiber segments be precisely aligned during fusion splicing.

Accordingly, a need in the art exists for an improved technique for creating internal partial mirrors in optical fibers.

SUMMARY OF THE INVENTION

The need in the art for an optical fiber disposed to be easily fabricated and to partially internally reflect optical energy passing therethrough is addressed by the optical fiber of the present invention. In particular, the inventive optical fiber includes an internal partial mirror designed to partially transmit and to partially reflect optical energy incident thereon. The fiber of the present invention includes a first fiber segment having a first core region which circumscribes a longitudinal axis. The first core region is of a first cross-sectional area perpendicular to the longitudinal axis. The inventive fiber further includes a second fiber segment in optical communication with the first fiber segment. The second fiber segment includes a second core region which circumscribes the longitudinal axis, wherein the second core region is of a second cross-sectional area perpendicular thereto.

BRIEF DESCRIPTION OF THE DRAWINGS

FIG. 2 shows a cross-sectional end view of a portion of a cladded slab S disposed to be conveniently mathematically analyzed in order to facilitate understanding of the optical fiber of the present invention in accordance with the teachings of the present invention.

FIG. 3 shows a simplified schematic view of an interferometric fiber optic sensor which incorporates a Fabry-Perot interferometer in accordance with the teachings of the present invention.

DETAILED DESCRIPTION OF THE INVENTION

Figure 1:
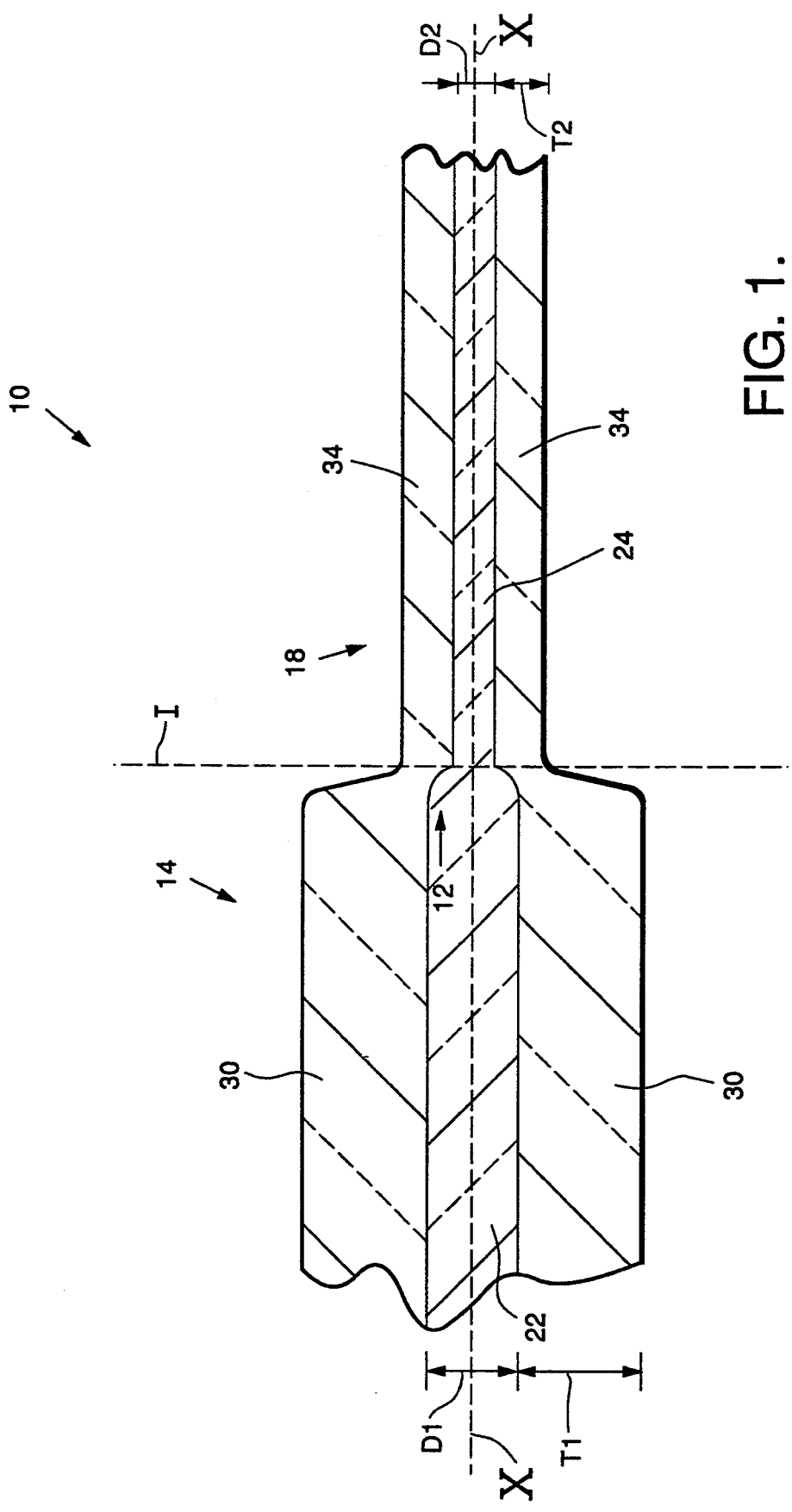
FIG. 1 is an illustrative side cross-sectional view of a preferred embodiment of an optical fiber constructed in accordance with the teachings of the present invention.

FIG. 1 is an illustrative side cross-sectional view of a preferred embodiment of an optical fiber 10 constructed in accordance with the teachings of the present invention. The inventive fiber 10 includes a first cylindrical fiber segment 14 and a second cylindrical fiber segment 18 in optical communication therewith. The fiber 10 is designed such that an internal partially reflective mirror 12 is effectively formed at an interface I separating the first and second fiber segments 14 and 18. As is shown in FIG. 1, the first and second fiber segments 14 and 18 include first and second cylindrical fiber cores 22 and 24. As is described more fully below, the internal partially reflective mirror 12 at the interface I is effected as a consequence of the difference in the cross-sectional areas of the cores 22 and 24. Since the first and second fiber segments 14 and 18 may be realized from a continuous length of cladded optical fiber, the inventive fiber 10 is easily fabricated without resort to splicing or fusion techniques.

As is illustrated by FIG. 1, the cylindrical fiber cores 22 and 24 have respective diameters D1 and D2 and circumscribe a longitudinal axis X. In addition, the fiber cores 22 and 24 are surrounded by first and second cladding layers 30 and 34 of thickness T1 and T2. The thicknesses T1 and T2 chosen for the cladding layers 30 and 34 relative to the core diameters D1 and D2 will depend on the contemplated mode of operation of the fiber 10. That is, the fiber 10 may be designed for either monomode (only a dominant propagation mode is supported) or multimode operation. However, it is noted that only monomode fibers typically maintain the spatial coherence of the guided beam. Accordingly, monomode fibers are typically preferred over multimode fibers for interferometric applications.

In monomode optical fibers, the ratios of the cladding thickness T1 to core diameter D1, and cladding thickness T2 to core diameter D2 are each typically on the order of twenty-to-one-. It follows that for a standard fiber diameter (D1+2T1) of one hundred twenty microns, the core diameter D1 will typically not exceed six microns. In multi-mode fibers, the ratio between the cladding thickness and core diameter will generally be much closer to unity. Multi-mode operation is also often facilitated by increasing the difference in the respective indices of refraction between the core and the cladding layer.

The fiber cores 22 and 24 may be realized from, for example, a mixture of silicon dioxide and germanium oxide ($GeO_2$) to yield an index of refraction of approximately 1.45. The cladding layers 30 and 34 may be realized from a variety of materials including fused quartz, plastic, or silicon dioxide ($SiO_2$). Silicon dioxide has an index of refraction of 1.45.

The inventive fiber 10 may generally be fashioned from a continuous length of optical fiber composed of, for example, the aforementioned silica materials. Specifically, the fiber 10 is preferably fabricated by elongating a first portion of an optical fiber of core diameter D1 and thickness T1. In this manner the second fiber segment 18 is created by elongating this first fiber portion until the core therein is of diameter D2 and the cladding is of thickness T2. Such an elongation may be effected by conventional techniques. In a particular technique, the first fiber portion is heated with a standard fiber splicing instrument until melting or a suitable softening occurs. The first fiber portion is then appropriately lengthened prior to resolidification (i.e. until the core is of diameter D2 and the cladding is of thickness T2).

The manner in which the difference in the cross-sectional areas of the first and second fiber cores 22 and 24 effectively creates a partially reflective mirror 12 at the interface I within the fiber 10 may be explained with reference to FIG. 2. FIG. 2 shows a cross-sectional end view of a portion of a cladded slab S disposed to be conveniently mathematically analyzed in order to facilitate understanding of the inventive fiber 10. The cladded slab S includes a planar core region C of width $2a$ sandwiched between first and second planar cladding layers L1 and L2. The slab S may be utilized to guide optical energy propagating therein in a direction perpendicular to the plane of FIG. 2. Accordingly, the effect of a change in the width of the core C upon optical energy guided by the slab S will be mathematically described in order to appreciate the manner in which the difference in the cross-sectional areas 22 and 24 effectively creates a partially reflective mirror within the inventive fiber 10.

In particular, the relevant electromagnetic wave equation may be expressed as:

$$d^2\mu/dx^2 + (w^2n^2/c^2 - k_p^2)\mu = 0 \qquad 1$$

where x is the coordinate perpendicular to the direction of optical propagation (i.e. normal to the plane of FIG. 2), n represents an index of refraction, c is the speed of light, w is the angular frequency of the light guided by the slab S, $k_p$ is the propagation wavenumber along the slab S normal to the plane of FIG. 2, and where $\mu$ denotes the Hertz potential. If the index of refraction of the core C is $n_1$, and that of the cladding is $n_c = n_1 - \beta n$, then on requiring that $\mu(x)$ vary as $$\mu(x) \to \cos kx \quad -a < x < a \quad [2]$$

$$\mu(x) \to A e^{-\alpha(x-a)} \quad x > a \quad [3]$$

$$\mu(x) \to A e^{+\alpha(x+a)} \quad x < -a \quad [4]$$

and setting $[1/\mu(x)]d\mu(x)/dx$ at $x = a^-$ equal to $[1/\mu(x)]d\mu(x)/dx$ at $x = a^+$, one obtains $$(k_x)\cdot\tan k_x a = \alpha \quad [5]$$

where $$k_x^2 = w^2 n_1^2/c^2 - k_p^2, \quad [6]$$

and $$\alpha^2 = -w2(n/c)^2 + k_p^2, \quad [7]$$

with $k_x$ denoting the propagation wavenumber in the x-direction (see FIG. 2), and with $\alpha$ being the attenuation coefficient within the cladding layers L1 and L2. For equations [6] and [7] to yield positive values requires that $$n_c^2 < k_p^2 c^2/w^2 < n_1^2. \quad [8]$$

Assume, first, that a substantial percentage of the optical energy present in the slab S propagates in an evanescent wave outside the core C and within the cladding layers L1 and L2. Under this condition the quantity $(k_x a)$ is much less than unity, which allows equation [5] to be approximated by $$k_x^2 a \approx \alpha. \quad [9]$$

From equations [6], [7] and [9] one then obtains:

$$k_p^2 = (\tfrac{1}{2})(2w^2 n_1^2/c^2 + 1/a^2) - (178a^2)[1 + (4 w^2 a^2/c^2)(n_1^2 - n_c^2)]^{\tfrac{1}{2}}. \quad [10]$$

Under the condition that the difference in the indices of refraction of the core C and the cladding L1 and L2 is small (i.e. $(4w^2 a^2/c^2)(n_1^2 - n_c^2) << 1$), or equivalently, $(8w^2 a^2/c^2)n_c \Delta n << 1$), equation [10] reduces to $$k_p \approx (w n_c/c)(1 + 2w^2 a^2 \Delta n^2/c^2). \quad [11]$$

By substituting equation [11] into equation [6] and observing that the quantity $(\Delta n)^2$ is negligibly small, equation [6] may be expressed as $$k_x^2 \approx (w^2/c^2) 2n \Delta n, \quad [12]$$

or $$k_x \approx (w/c)(2n_c \Delta n)^{\tfrac{1}{2}}. \quad [13]$$

Finally, combining equations [9] and [13] yields $$\alpha \approx (w^2/c^2) 2n_c a \Delta n \quad [14]$$

In the aforementioned evanescent mode, the reflection coefficient R associated with a change in the width of the core C from "a" to "b" is $$R = \left[\frac{k_{p,a} - k_{p,b}}{k_{p,a} + k_{p,b}}\right]^2 \quad [15]$$

where $k_{p,a}$ and $k_{p,b}$ denote the propagation wavenumbers perpendicular to the plane of FIG. 2 in the regions of the core C of width "$2a$" and "$2b$", respectively. If it is again assumed that $\Delta n$ is very small, that is $$w << (c/n_c a)(n_c/8\Delta n), \text{ then } R \approx [w^2(\Delta n)^2(a^2 - b^2)]^2. \quad [16]$$

By performing an analysis similar to the foregoing in a cylindrical coordinate system an expression analogous to equation [16] may be obtained for the reflectivity of the internal mirror 12 within the inventive fiber 10.

Again with reference to FIG. 2, consider the case in which most of the energy propagating within the slab S is transmitted by the core C rather than by the cladding layers L1 and L2. If N is chosen to denote the number of maxima in the optical field in the x-direction within the core C, then $$k_x \approx \pi N/a, \quad [17]$$

$$k_p^2 \approx w^2 n_1^2/c^2 - (\pi N/a)^2, \quad [18]$$

and $$\alpha^2 = k_p^2 - w^2 n_c^2/c^2, \quad [19]$$

or $$\alpha^2 \approx (w^2/c^2)(n_1^2 - n_2^2) - (\pi N/a)^2. \quad [20]$$

If it is assumed that the width (i.e. $2a$) of the core C is relatively large, then $$(w^2/c^2)(n_1^2 - n_2^2) >> (\pi N/a)^2. \quad [21]$$

Applying this condition to equation [20] yields $$\alpha \approx (w/c)(2n_1 \Delta n)^{\tfrac{1}{2}} \quad [22]$$

Again, equations [14] and [22] quantify the attenuation coefficients within the cladding L1 and L2 in the respective propagation modes mentioned above. In the latter propagation mode (i.e. wherein the preponderance of the optical energy guided by the slab S is transmitted by the core C), the reflection coefficient R' associated with the interface of the segments of the core C of width $2a$ and $2b$ may be expressed as $$R' \approx 1 - a/b \text{ for } a < b. \quad [23]$$

Equation [23] may be extended to approximate the reflection coefficient $R_m$ exhibited by the cylindrical embodiment of the inventive fiber 10 depicted in FIG. 1. Specifically, the reflection coefficient $R_m$ of the partial mirror 12 at the interface I between the first and second cylindrical fiber segments depends on the ratio of the cross-sectional areas thereof. Accordingly, given that the segments 12 and 14 are of diameter D1 and D2 (FIG. 1), it follows that $$R_m \approx 1 - D2^2/D1^2 \text{ for } D2 < D1. \quad [24]$$

Because equation [24] and the cylindrical coordinate counterpart to equation [16] allow estimation of the reflectivity of the internal mirrors described above, the optical fiber of the present invention may be employed in a variety of fiber sensors. For example, an embodiment of the inventive fiber which includes a pair of internal partially reflective mirrors may be used to create a Fabry-Perot interferometer. As mentioned in the Background of the Invention, Fabry-Perot interferometers are utilized within a number of highly accurate fiber optic sensors.

FIG. 3 shows a simplified schematic view of a Fabry-Perot interferometric fiber optic sensor 100. As shown in FIG. 3, the sensor 100 includes an embodiment of the inventive fiber 110 designed to be employed as a Fabry-Perot interferometer. Specifically, the fiber 110 includes first, second and third cylindrical fiber segments 114, 116 and 118, with the second segment 116 defining an interferometric cavity of length L. The second segment 116 is in communication with a measurand having a parameter (e.g. temperature or magnetic field) to be monitored by the sensor 100.

Inherent in the fiber 110 is a first partially reflective internal mirror 112 at a first interface I1 of the first and second fiber segments 114 and 116, and a second partially reflective internal mirror 113 at a second interface I2 of the second and third fiber segments 116 and 118. The segments 114, 116 and 118 include fiber cores (not shown) of radii $r_1$, $r_2$ and $r_3$. Knowledge of the radii of the segments 114, 116 and 118 enables the reflectivities R1 and R2 of the first and second internal partial mirrors to be calculated as described above. Again, the values obtained for the reflectivities R1 and R2 will depend on the particular mode (e.g. evanescent) in which the fiber 110 is disposed to operate.

As shown in FIG. 3, the sensor 100 further includes a laser or equivalent optical source 122 for providing a coherent beam of light. The coherent beam from the source 122 is transmitted to a first focusing lens 126 by a beamsplitter 124. The beamsplitter 124 is also disposed to redirect optical energy reflected by the fiber 110 to a first photodetector 130. The focusing lens 126 is conventionally coupled to the first fiber segment 114, and is designed to launch the coherent source beam therein. A second focusing lens 134 conventionally coupled to the third segment 118 serves to focus optical energy transmitted by the fiber 110 upon a second photodetector 138. Alternatively, the second photodetector 138 may be directly coupled to the third segment 118. By appropriate selection of the reflectivities R1 and R2 the sensor 100 may either be transmissively monitored by the second photodetector 138, or reflectively monitored by the first photodetector 130. The photodetectors 130 and 138 may be realized from PIN photodiode light detectors, for example. Output signals provided by the detectors 130 and 138 are indicative of the intensity of the energy reflected and transmitted, respectively, by the fiber 110.

The reflectance $R_{FP}$ of the fiber optic Fabry-Perot interferometer 110 is defined by the ratio of the optical power incident thereon to the optical power reflected thereby. The incident optical power corresponds to the fraction of the source beam actually coupled into the first segment 114, while the latter corresponds to the optical power reflected thereby. Assuming the interferometer 110 is lossless, the reflectance thereof may be expressed as $$R_{FP} = R1 + R2 + 2(R1 \cdot R2)^{\frac{1}{2}} \cos \Phi \qquad 25$$

where $\Phi$, the round trip phase shift within the cavity of the interferometer (i.e. the second segment 116 of length L), is given by $$\Phi = 4\pi n L \tau / c. \qquad 26$$

In equation [26], n is the effective refractive index of the interferometer cavity, $\tau$ is the optical frequency of the source 122, and c is the free space velocity of light.

As is apparent upon inspection of equation [25], phase changes arising due to perturbations in the monitored parameter of the measurand may induce the power detected by the photodetector 130 to vary from a maximum value of $R1 + R2 + 2(R1 \cdot R2)^{\frac{1}{2}}$ to a minimum value of $R1 + R2 - 2(R1 \cdot R2)^{178}$. If R1 is selected to be equivalent to R2, then the power reflected by the interferometer 110 and measured by the photodetector 130 will be zero for $\Phi = (2m - 1)\pi$ where m is an integer. The response of the interferometer 110 is thus a periodic function of the monitored measurand parameter provided that the phase of the optical energy within the second fiber 116 linearly depends thereon. A similar analysis may be undertaken if the interferometer 110 is to be transmissively monitored by the second photodetector 138.

Thus the present invention has been described with reference to a particular embodiment in connection with a particular application. Those having ordinary skill in the art and access to the teachings of the present invention will recognize additional modifications and applications within the scope thereof. For example, the core and cladding regions of the inventive fiber are not limited to being substantially cylindrical. Those skilled in the art may be aware of applications wherein optical fibers of irregularly shaped cross-section are of significant utility. Moreover, in alternative embodiments of the present invention multiple internal mirrors of differing reflectivity may be effected by providing a plurality of fiber segments having cross-sections dimensioned in accord with the teachings herein.

It is therefore contemplated by the appended claims to cover any and all such modifications.

Accordingly,

What is claimed is:

1. An optical fiber disposed to partially transmit and to partially reflect optical energy incident thereon, said fiber comprising:

a continuous, uninterrupted length of cladded optical fiber, having a first core region which circumscribes a longitudinal axis, said first core region being of a first cross-sectional area perpendicular to said longitudinal axis, and a first cladding layer surrounding said first core region;

a fiber segment, said fiber segment formed from said continuous, uninterrupted length of cladded optical fiber, said fiber segment having a second core region which circumscribes said axis wherein said second core region is of a second cross-sectional area perpendicular to said axis, and a second cladding layer surrounding said second core region wherein said first core region is in optical communication with said second core region and said second cross-sectional area is less than said first cross-sectional area; and a partially reflecting mirror, said partially reflecting mirror optically formed between and separating said first and said second core regions of differing cross-sectional area.

2. The optical fiber of claim 1 wherein said first and second core regions are of a first index of refraction, and wherein said first and second cladding layers are of a second index of refraction wherein said second index of refraction is less than said first index of refraction.

3. An optical fiber disposed to partially transmit and to partially reflect optical energy incident thereon, said fiber comprising:

a continuous, uninterrupted length of cladded optical fiber, having a first core region which circumscribes a longitudinal axis, said first core region being of a first cross-sectional area perpendicular to said longitudinal axis, and a first cladding layer surrounding said first core region;

a fiber segment, said fiber segment formed from said continuous uninterrupted length of cladded optical fiber, said fiber segment having a second core region which circumscribes said axis wherein said second core region is of a second cross-sectional area perpendicular to said axis, and a second cladding layer surrounding said second core region wherein said first core region is in optical communication with said second core region and said second cross-sectional area is less than said first cross-sectional area;

a partially reflecting mirror, said partially reflecting mirror optically formed between and separating said first and said second core regions of differing cross-sectional area and wherein said first and second core regions are of a first index of refraction and said first and second cladding layers are of a second index of refraction where said second index of refraction is less than said first index of refraction; and wherein said partial mirror is of a reflectivity Re when said fiber is operative in and evanescent mode, said reflectivity Re being given by:

$$Re = \left[ \frac{k1 - k2}{k1 + k2} \right]^2$$

where k1 is the propagation wavenumber within the first fiber and k2 is the propagation wavenumber within the fiber segment.

4. An optical fiber disposed to partially transmit and to partially reflect optical energy incident thereon, Said fiber comprising:

a continuous, uninterrupted length of cladded optical fiber, having a first core region which circumscribes a longitudinal axis, said first core region being of a first cross-sectional area perpendicular to said longitudinal axis, and a first cladding layer surrounding said first core region;

a fiber segment, said fiber segment formed from said continuous, uninterrupted length of cladder optical fiber, said fiber segment having a second core region which circumscribes said axis wherein said second core region is of a second cross-sectional area perpendicular to said axis, and a second cladding layer surrounding said second core region wherein said first core region is in optical communication With said second core region and said second cross-sectional area is left than said first cross-sectional area;

a partially reflecting mirror, said partially reflecting mirror optically formed between and separating said first and said second core regions of differing cross-sectional area and wherein said first and, second core regions are of a first index of refraction, and said first and second cladding layers are of a second index of refraction where said second index of refraction is less than said first index of refraction; and wherein said integral partial mirror if of reflectivity Re when said fiber is operative in and evanescent mode, said reflectivity Re being given by:

$$Re = \left[ \frac{k1 - k2}{k1 + k2} \right]^2$$

where k1 is the propagation wavenumber within the fiber and K2 is the propagation wavenumber within the fiber segment; and said integral partial mirror is of a reflectivity Rc when a majority of said optical energy propagating through said first and second fiber segments is carried by said first and second core regions, said reflectivity Rc being given by Rc=1−A1/A2 wherein A1 corresponds to said first cross-sectional area and A2 corresponds to said second cross-sectional area and wherein A1>A2.

5. In a fiber optic interferometer having an optical energy source, a photodetector, and a continuous, uninterrupted optical fiber having dual integral partially reflective mirrors therebetween, said optical fiber comprising:

a first fiber segment formed of said continuous, uninterrupted optical fiber having a first core region which circumscribes a longitudinal axis, said core region being of a first cross-sectional area perpendicular to said longitudinal axis;

a second fiber segment formed of said continuous, uninterrupted optical fiber in optical communication with said first fiber segment, said second fiber segment having a second core region which circumscribes said axis wherein said second core region is of a second cross-sectional area perpendicular to said axis, said second cross-sectional area being less than said first cross-sectional area; and a third fiber segment formed from said continuous uninterrupted optical fiber in optical communication with said second fiber segment, said third fiber segment having a third core region which circumscribes said axis wherein said third core region is of a third cross-sectional area perpendicular to said axis, wherein said third cross-sectional area is greater than said second cross-sectional area.

6. In a fiber optic interferometer having an optical energy source, a photodetector, and disposed therebetween an improved optical fiber having dual integral partially reflective mirrors, said improved optical fiber comprising:

a first fiber segment having a first core region which circumscribes a longitudinal axis, said first core region being of a first cross-sectional area perpendicular to said longitudinal axis;

a second fiber segment in optical communication with said first fiber segment, said second fiber segment having a second core region which circumscribes said axis wherein said second core region is of a second cross-sectional area perpendicular to said axis, wherein said second cross-sectional area is less than said first cross-sectional area; and a third fiber segment in optical communication with said second fiber segment, said third fiber segment having a third core region which circumscribes said axis wherein said third core region is of a third cross-sectional area which equals said first cross-sectional area perpendicular to said axis.

7. In a fiber optic interferometer having an improved optical fiber with dual integral partially reflective mirrors, an optical energy source, and a photodetector, said improved optical fiber comprising:

a first fiber segment operatively coupled to said optical source and to said photodetector, said first fiber segment having a first core region which circumscribes a longitudinal axis wherein said first core region is of a first cross-sectional area perpendicular to said longitudinal axis;

a second fiber segment in optical communication with said first fiber segment, said second fiber segment having a second core region which circumscribes said axis wherein said second core region is of a second cross-sectional area perpendicular to said axis wherein said second cross-sectional area is less than said first cross-sectional area; and a third fiber segment in optical communication with said second fiber segment, said third fiber segment having a third core region which circumscribes said axis wherein said third core region is of a third cross-sectional area perpendicular to said axis wherein said third cross-sectional area is greater than said second cross-sectional area.

8. In a fiber optic interferometer having an improved optical fiber with dual internal partially reflective mirrors, an optical energy source, and a photodetector, said improved optical fiber comprising:

a first fiber segment operatively coupled to said optical source and to said photodetector, said first fiber segment having a core region which circumscribes a longitudinal axis wherein said first core region is of a first cross-sectional area perpendicular to said longitudinal axis;

a second fiber segment in optical communication with said first fiber segment, said second fiber segment having a second core region which circumscribes said axis wherein said second core region is of a second cross-sectional area perpendicular to said axis wherein said second cross-sectional area is less than said first cross-sectional area; and a third fiber segment in optical communication with said second fiber segment, said third fiber segment having a third core region which circumscribes said axis wherein said third core region is of the same cross-sectional area as said first cross-sectional area perpendicular to said axis.

9. An optical fiber disposed to partially transmit and to partially reflect optical energy incident thereon, said fiber comprising:

a continuous, uninterrupted length of cladded optical fiber, having a first core region which circumscribes a longitudinal axis, said first core region being of a first cross-sectional area perpendicular to said longitudinal axis, and a first cladding layer surrounding said first core region;

a fiber segment, said fiber segment formed from said continuous length of cladded optical fiber, in optical communication with said first core region, said fiber segment having a second core region which circumscribes said axis wherein said second core region is of a second cross-sectional area perpendicular to said axis, wherein said second cross-sectional area is less than said first cross-sectional area and a second cladding layer surrounding said second core region, wherein said first and second core regions are of a first index of refraction; and wherein said first and second cladding layers are of a second index of refraction less than said first index of refraction:

an integral partially reflective mirror, said integral partially reflecting mirror formed at an interface between said first core region and said second core region wherein said integral partial mirror is of a reflectivity Re when said fiber is operative in an evanescent mode, said reflectivity Re being given by:

$$Re = \left[ \frac{k1 - k2}{k1 + k2} \right]^2$$

where k1 is the propagation wavenumber within the fiber and k2 is the propagation wavenumber within the fiber segment.

10. An optical fiber disposed to partially transmit and to partially reflect optical energy incident thereon, said fiber comprising:

a continuous, uninterrupted length of cladded optical fiber, having a first core region which circumscribes a longitudinal axis, said first core region being of a first cross-sectional area perpendicular to said longitudinal axis, and a first cladding layer surrounding said first core region;

a fiber segment, said fiber segment formed from said continuous length of cladded optical fiber, in optical communication with said fiber, said fiber segment having a second core region which circumscribes said axis wherein said second core region is of a second cross-sectional area perpendicular to said axis, and a second cladding layer surrounding said second core region, wherein said first and second core regions are of a first index of refraction; and wherein said first and second cladding layers are of a second index of refraction less than said first index of refraction; and an partially reflecting mirror, said integral partially reflecting mirror formed at an interface separating said first and said second core regions, wherein said integral partial mirror is of a reflectivity Rc when a majority of said optical energy propagating through said fiber said fiber segment if carried by said first and second core regions, said reflectivity Rc being given by Rc=1−A1/A2 wherein A1 corresponds to said first cross-sectional area and wherein A1>A2.

* * * * *